United States Patent
Nichani et al.

(10) Patent No.: US 11,784,983 B1
(45) Date of Patent: *Oct. 10, 2023

(54) SSL ENCRYPTION WITH REDUCED BANDWIDTH

(71) Applicant: Wells Fargo Bank, N.A., San Francisco, CA (US)

(72) Inventors: Santosh Nichani, Secunderabad (IN); Ramanathan Ramanathan, Bellevue, WA (US); Srinivas Vengala, Secunderabad (IN); Sri Rajesh Rayudu, Hyderabad (IN); Rameshchandra Bhaskar Ketharaju, Hyderabad (IN); Shanmukeswara Rao Donkada, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 17/181,749

(22) Filed: Feb. 22, 2021

Related U.S. Application Data

(63) Continuation of application No. 15/385,001, filed on Dec. 20, 2016, now Pat. No. 10,951,591.

(51) Int. Cl.
*H04L 9/40* (2022.01)
*H04L 67/10* (2022.01)

(52) U.S. Cl.
CPC ........ *H04L 63/0428* (2013.01); *H04L 63/166* (2013.01); *H04L 67/10* (2013.01)

(58) Field of Classification Search
CPC .... H04L 63/0428; H04L 63/166; H04L 67/10
See application file for complete search history.

(56) References Cited

U.S. PATENT DOCUMENTS

| | | | | |
|---|---|---|---|---|
| 6,021,426 A | * | 2/2000 | Douglis | H04L 67/568 709/200 |
| 7,275,116 B1 | * | 9/2007 | Hanmann | H04L 51/066 709/248 |
| 7,283,468 B1 | * | 10/2007 | Hill | H04L 47/10 370/468 |
| 7,725,584 B1 | * | 5/2010 | Hanmann | H04L 67/1095 709/227 |
| 8,561,127 B1 | * | 10/2013 | Agrawal | H04L 63/105 726/13 |

(Continued)

*Primary Examiner* — David Garcia Cervetti
(74) *Attorney, Agent, or Firm* — Kilpatrick Townsend & Stockton LLP

(57) ABSTRACT

Systems and methods provide for a solution for encryption by dynamically opening multiple channels between the client and the server, where the channels include both secured (e.g., SSL/TLS and etc.) channels and non-secured channels. Non-sensitive information can be over non-secured channels, and sensitive information can be sent via the secured channels. The system can recognize whether the information is sensitive or not via the use of tags on a page or frame that delineate which information is sensitive. For instance, on a form, tags can mark off the areas of the form that may contain sensitive information, such as social security numbers, names, addresses, financial information, and other private information. All the data within the tags can be considered sensitive and so be communicated to the server via a secure channel while other data can be transmitted through unsecured channels.

20 Claims, 10 Drawing Sheets

(56) References Cited

U.S. PATENT DOCUMENTS

| | | | |
|---|---|---|---|
| 8,812,951 B1* | 8/2014 | White | G06F 40/103 715/255 |
| 8,938,775 B1* | 1/2015 | Roth | G06F 21/606 726/1 |
| 8,942,678 B2* | 1/2015 | Furuta | H04L 65/765 455/414.2 |
| 9,432,336 B2* | 8/2016 | Ostrowski | H04L 63/029 |
| 9,923,923 B1* | 3/2018 | Sharifi Mehr | H04L 63/0428 |
| 10,257,197 B2* | 4/2019 | White | G06F 21/6245 |
| 10,263,783 B2* | 4/2019 | Bohli | G06F 21/64 |
| 10,757,111 B1* | 8/2020 | Marek | H04L 63/1416 |
| 2002/0078178 A1* | 6/2002 | Senoh | G06F 21/10 709/219 |
| 2002/0162024 A1* | 10/2002 | Cunchon | H04L 63/104 726/12 |
| 2003/0110169 A1* | 6/2003 | Zuili | H04L 63/04 707/999.009 |
| 2004/0047470 A1* | 3/2004 | Candelore | H04N 21/44055 386/E5.052 |
| 2005/0096765 A1* | 5/2005 | Rao | G10L 19/16 381/1 |
| 2006/0179464 A1* | 8/2006 | Park | H04N 21/26616 348/E7.071 |
| 2007/0076882 A1* | 4/2007 | Engel | H04L 63/0457 380/255 |
| 2010/0167746 A1* | 7/2010 | Lee | H04W 48/12 455/450 |
| 2011/0055886 A1* | 3/2011 | Bennett | H04L 63/18 370/328 |
| 2011/0072507 A1* | 3/2011 | Johnston, II | H04L 63/0853 726/12 |
| 2012/0110680 A1* | 5/2012 | Oliver | H04L 63/102 726/30 |
| 2012/0206760 A1* | 8/2012 | Asahara | G06F 3/1285 358/1.15 |
| 2012/0263303 A1* | 10/2012 | Tang | H04L 9/0833 380/279 |
| 2013/0036196 A1* | 2/2013 | Chan | H04N 21/6582 709/217 |
| 2013/0058479 A1* | 3/2013 | Tang | H04L 9/0836 380/46 |
| 2013/0301828 A1* | 11/2013 | Gouget | H04L 9/0877 380/44 |
| 2013/0305145 A1* | 11/2013 | Jackson | G06F 40/103 715/246 |
| 2014/0019307 A1* | 1/2014 | Guardalben | G06Q 30/0641 705/27.1 |
| 2014/0317405 A1* | 10/2014 | Johnson | H04L 63/0485 713/164 |
| 2015/0382284 A1* | 12/2015 | Brismar | H04W 28/085 370/329 |
| 2016/0217276 A1* | 7/2016 | Choi | H04L 63/0428 |
| 2018/0098101 A1* | 4/2018 | Pont | H04N 21/84 |

* cited by examiner

700

START

702
ESTABLISHING, BY A MOBILE DEVICE COMPRISING A PROCESSOR, A PLURALITY OF DATA TRANSMISSION CHANNELS TO A SERVER, WHEREIN THE DATA TRANSMISSION CHANNELS ARE CONFIGURED TO TRANSMIT A SET OF DATA TO THE SERVER AND WHEREIN THE PLURALITY OF DATA TRANSMISSION CHANNELS COMPRISE AN UNSECURED CHANNEL A SECURED CHANNEL

704
DETERMINING, BY THE MOBILE DEVICE, THAT THE SET OF DATA COMPRISES A FIRST SET OF CONFIDENTIAL DATA, AND A SECOND SET OF NON-CONFIDENTIAL DATA WHEREIN THE NON-CONFIDENTIAL DATA COMPRISES STATIC INFORMATION AND THE CONFIDENTIAL DATA COMPRISES DYNAMIC INFORMATION

706
TRANSMITTING, BY THE MOBILE DEVICE, THE FIRST SET OF CONFIDENTIAL DATA VIA THE SECURED CHANNEL, AND TRANSMITTING THE NON-CONFIDENTIAL DATA VIA THE UNSECURED CHANNEL

END

FIG. 7

SSL ENCRYPTION WITH REDUCED BANDWIDTH

CROSS REFERENCE TO RELATED APPLICATIONS

This application is a continuation of U.S. patent application Ser. No. 15/385,001, filed Dec. 20, 2016, and entitled "SSL Encryption with Reduced Bandwidth," the entirety of which is incorporated herein by reference.

BACKGROUND

Secure Sockets Layer (SSL) and Transport Layer Security (TLS—also often referred to as SSL) are security technologies for establishing an encrypted link between a web server and a browser. These links ensure that data passed between the web server and the browsers remains private and integral. However, SSL and TLS layers impact the communications performance. During the handshake protocol the secure link is established between the client and the server with an asymmetric cipher to establish cipher settings and a shared key for a session are exchanged. This handshake is computationally intense however, and consumes a significant amount of a processor resources, especially for lightweight mobile devices and Internet of Things (IoT) devices.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

Aspects of the subject disclosure include systems and methods that facilitate a solution for encryption by dynamically opening multiple channels between the client and the server, where the channels include both secured (e.g., SSL/TLS and etc.) channels and non-secured channels. Non-sensitive information can be communicated over non-secured channels, and sensitive information can be sent via the secured channels. The system can recognize whether the information is sensitive or not via the use of tags on a page or frame that delineate which information is sensitive. For instance, on a form, tags can mark off the areas of the form that may contain sensitive information, such as social security numbers, names, addresses, financial information and other private information. All the data within the tags can be considered sensitive and be communicated to the server via a secure channel. All other information, including page layout, style, and template information can be sent over unsecured channels that do not require the same computing power as the secured channels.

It is to be appreciated that, in aspects, tags can be used to determine and/or establish what type of security policy should be used. Some require strong encryption, some might not need encryption at all, and some might require 'light weight' encryption. If there are no tags, the information will be transmitted in clear-text. If there is a tag, the information between the beginning of the tag to the end of tag will be sent according to the security policy of the tag. As will be understood, there can be 'n' number of tags in a document collectively represent 'm' security policies (m<=n). The computer will scan the document before sending and determine the number of channels to open based on the type of tags present. In other embodiments, the system can also do that at run time without pre-scanning. It can start with one non-secure channel (e.g., clear-text channel) and as it encounters a tag it can determine whether it has to open a new secure channel or not.

For these considerations, as well as other considerations, in accordance with one aspect, a system is provided that comprises a processor coupled to a memory that stores instructions that, when executed by the processor, cause the processor to identify static data and dynamic data of a set of data, wherein the dynamic data changes between frames or sessions, classify the static data as non-sensitive data and the dynamic data as sensitive data, and initiate transmission of the non-sensitive data on an unsecure communication channel and the sensitive data on a secure communication channel. The instructions further cause the processor to initiate transmission of the sensitive data based on a security policy that specifies one or more rules regarding the sensitive data. One rule can specify encryption type for the sensitive data. Another rule can specify access rights to the sensitive data. The instructions can further cause the processor to identify a type of the sensitive data. The type can be identified based on a tag associated with the sensitive data or analysis of the form of the sensitive data. The instructions can further cause the processor to vary one of encryption or communication channel based on the type of the sensitive data. In one instance, the static data can comprise page layout, style, or template information, and the dynamic data can comprise name, address, or financial information.

In another aspect, a method is disclosed comprising identifying static data and dynamic data in a set of data, wherein the dynamic data changes between frames or sessions, classifying the static data as non-sensitive data and the dynamic data as sensitive data, opening at least one secure communication channel and at least one unsecure communication channel to a network entity, and initiating transmission of the non-sensitive data over the unsecure communication channel and the sensitive data over the secure communication channel. The method further comprises comprising initiating transmission of the sensitive data based on a security policy that specifies one or more rules associated with the sensitive data. Further, the method comprises initiating encryption of the sensitive data based on a rule of the one or more rules that specifies an encryption scheme for the sensitive data. The method can also comprise setting access rights for the sensitive data based on a rule of the one or more rules. The method can further comprise varying employment of at least one of encryption or communication channel based on type of the sensitive data. Identifying the type of the sensitive data can be based on a tag associated with the sensitive data or one or more features of the sensitive data.

In accordance with another aspect, a computer-readable storage medium is provided that stores instruction that, when executed by a processor, cause the processor to perform operations, comprising identifying static data and dynamic data in a set of data, wherein the dynamic data changes between frames or sessions, classifying the static data as non-sensitive data and the dynamic data as sensitive data, establishing at least one secure communication channel and at least one unsecure communication channel to a network entity, and initiating transmission of the non-sensitive data on the unsecure communication channel and the sensitive data on the secure communication channel. The operations can further comprise initiating transmission of the sensitive data based on a security policy that specifies one or more rules associated with the sensitive data. Furthermore, the operations can comprise varying employment of at least one of encryption or communication channel based on a determined type of the sensitive data.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

FIG. 7 is an illustration of an example flow chart of a method for providing encryption according to one or more embodiments.

DETAILED DESCRIPTION

Figure 1:
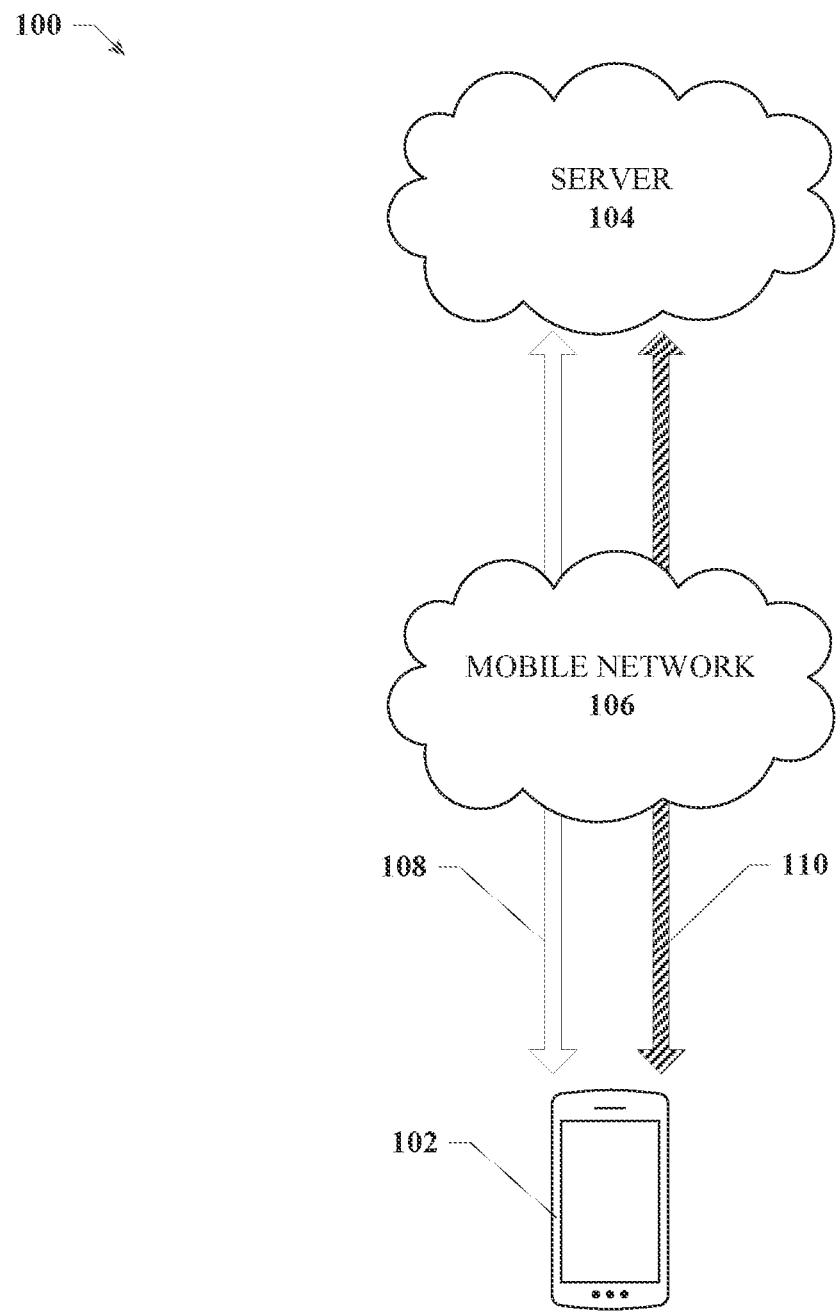
FIG. 1 is an illustration of an example system for providing a SSL/TLS encryption system in accordance with one or more aspects of the disclosure.

The following terms are used throughout the description, the definitions of which are provided herein to assist in understanding various aspects of the disclosure.

As used in this disclosure, the term "device" or "client device" refers to devices, items or elements that may exist in an organization's network, for example, users, groups of users, computer, tablet computer, smart phone, iPad®, iPhone®, wireless access point, wireless client, thin client, applications, services, files, distribution lists, resources, printer, fax machine, copier, scanner, multi-function device, mobile device, badge reader and most any other networked element.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein, it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

In one or more embodiments a solution for encryption can be provided by dynamically opening multiple channels between the client and the server, where the channels include both secured (e.g., SSL/TLS and etc.) channels and non-secured channels. Non-sensitive information can be over non-secured channels, and sensitive information can be sent via the secured channels.

The system can recognize whether the information is sensitive or not via the use of tags on a page or frame that delineate which information is sensitive. For instance, on a form, tags can mark off the areas of the form that may contain sensitive information, such as social security numbers, names, addresses, financial information and other private information. All the data within the tags can be considered sensitive and so be communicated to the server via a secure channel. All other information, including page layout, style, and template information can be sent over unsecured channels that don't require the same computing power as the secured channels.

In an embodiment, the dynamic information can be sent over the secured channels while static information can be sent over unsecured channels. In other embodiments, the system can determine whether information is sensitive or not based on an analysis of the data and determining character types, formats, and length. For instance, credit card numbers can be identified based on a recognizable sequence of numbers, while social security numbers and other identification numbers can be based on identifying sequences of numbers (e.g., xxx-xx-xxxx).

In an embodiment, the tags that are used to identify sensitive information can be further separated into different types of tags based on the field or type of information. For instance, Tag A can refer to a certain type of sensitive data, Tag B can refer to a second type of sensitive data and so forth. The system can refer to a security policy for the client or server or site in order to determine how to treat various types of information or types of tags. For instance, Tag A can have a first security policy assigned, while Tag B can have a second security policy. The security policies can include rules about which types of encryption are used, who is authorized to access the data, and other security rules.

Turning now to FIG. 1, illustrated is an example system 100 for providing a SSL/TLS encryption system in accordance with one or more aspects of the disclosure. The system 100 in FIG. 1 includes a mobile device 102 that can send and receive data to and from a server 104 via a mobile network 106. To protect sensitive information such as name, address, phone number, financial information and other identifying information, the mobile device 102 and server 104 can establish a secured link that uses encryption to protect the information contained in the communications.

In traditional communications, the server 104 and the mobile device 102 would establish a secure channel and all of the data passed between the server 104 and the mobile device 102 would pass through the secure channel. In the embodiment disclosed herein however, the mobile device 102 can simultaneously establish a first channel 108 that is unsecured, and a second channel 110 that is secured. Unsecured channel 108 can facilitate transmission of unsecured data or data that is not sensitive, while secured channel 110 can facilitate transmission of secured or sensitive data.

By way of example, if mobile device 102 was transmitting form information from a website, the content of the forms may be sensitive and so that data can be transmitted to the server 104 via the mobile network 106 by the secured channel 110. Other information transmitted, such as the layout, template, style data, etc., can be transmitted by the unsecured channel 108. Since data transmitted by the secured channel 110 requires greater computer processing resources to encrypt, by reducing the amount of data sent via the secured channel 110, and by sending it via an unsecured channel 108, the computing resources required by mobile device 102 can be decreased, improving battery life, reducing the processing requirements, and improving bandwidth of the mobile device 102.

The mobile device 102 and/or the server 104 can determine what is sensitive data or data that otherwise should be encrypted in a variety of ways. In one embodiment, data can be tagged using metadata or HTML, tags or other forms of tags, where the tagged data is data the intended to be secured via SSL encryption. In an embodiment, the mobile device 102 or server 104, depending on whether the data is being transmitted to the server 104 or to the mobile device 102 respectively, can identify the tags, and send untagged data via the unsecured channel 108 and send tagged data via the secured channel 110.

In other embodiments, the sensitive data can be identified without the use of tags. Data that is static (e.g., the form templates, styles, outlines, etc.) can be determined to be unsensitive and thus can be sent via the unsecured channel 108. Data that is dynamic, and changes between frames, sessions, etc., can be determined to be sensitive, and thus can be sent via the secured channel 110.

In other embodiments, the sensitive data can be identified based on a pattern analysis of the data. Commonly transmitted data that might be sensitive and thus require encryption can be financial information such as bank account numbers, routing numbers, credit card numbers, and etc. The information can also include addresses, names, birthdates, and etc. These types of information commonly follow similar formats such as a pattern of numbers and characters, length of string of characters, and etc. For instance, social security numbers can be recognized by their familiar pattern of 9 numbers separated by dashes in groups of 3, 2, and 4. Similarly, credit card numbers will have common patterns and dates will have similar patterns and other identification numbers and information can be identified similarly.

In an embodiment, the type of encryption or type of secure channel established by the mobile device 102 or server 104 can be selected based on one or more security policies located at either the client or server side. The security policy can state that a certain type of encryption should be used whenever sensitive data is identified. In other embodiments, different encryption and security schemes can be used for different types of data. For instance, identifying data such as names and addresses can be associated with a first type of encryption scheme, while financial information can be associated with a second type of encryption scheme. In an embodiment, separate secured channels can be opened simultaneously between server 104 and the mobile device 102 in order to transmit the different types of confidential data at the same time. The security policy can be stored in a rules database on either the mobile device 102 or the server 104, and can specify different rules and procedures about how data is to be handled.

It is to be appreciated the secure tunnel 110 can include either SSL or TLS encryption or any other encryption scheme that a person having ordinary skill in the art would contemplate.

Figure 2:
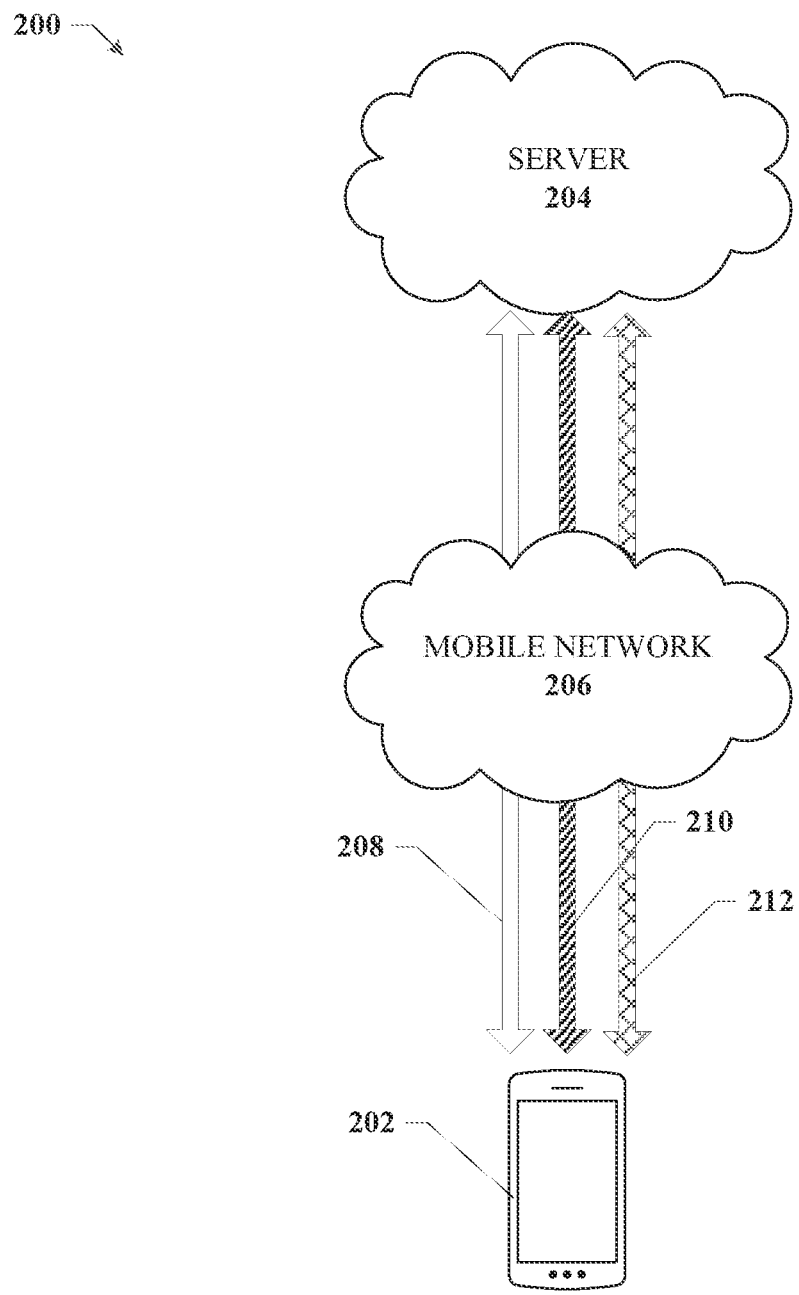
FIG. 2 is an illustration of an example system for providing a SSL/TLS encryption system with multiple secure channels in accordance with one or more aspects of the disclosure.

Turning now to FIG. 2, illustrated is an example system 200 for providing a SSL/TLS encryption system with multiple secure channels in accordance with one or more aspects of the disclosure.

The system 200 in FIG. 2 includes a mobile device 202 that can send and receive data to and from a server 204 via a mobile network 206. To protect sensitive information such as name, address, phone number, financial information and other identifying information, the mobile device 202 and server 204 can establish a plurality of secured links 210 and 212 that use encryption to protect the information contained in the communications.

In an embodiment, the type of encryption or type of secure channel established by the mobile device 202 or server 204 can be selected based on one or more security policies located at either the client or server side. The security policy can state that a certain type of encryption should be used whenever sensitive data is identified. In other embodiments, different encryption and security schemes can be used for different types of data. For instance, identifying data such as names and addresses can be associated with a first type of encryption scheme, while financial information can be associated with a second type of encryption scheme. In an embodiment, separate secured channels (e.g., 210 and 212) can be opened simultaneously between server 204 and the mobile device 202 in order to transmit the different types of confidential data at the same time. The security policy can be stored in a rules database on either the mobile device 202 or the server 204, and can specify different rules and procedures about how data is to be handled.

The mobile device 202 and/or the server 204 can determine what type of sensitive data is present and determine whether it should be transmitted by secure channel 210, or secure channel 212, or by unsecured channel 208. In one embodiment, data can be tagged using metadata or HTML tags or other forms of tags, where the tagged data is data the intended to be secured via SSL encryption. The tag can include information identifying the type of confidential data, or include information identifying the type of encryption required. In an embodiment, the mobile device 202 or server 204, depending on whether the data is being transmitted to the server 204 or to the mobile device 202 respectively, can identify the tags, and send untagged data via the unsecured channel 208 and send tagged data via either the secured channel 210 or secured channel 212.

In other embodiments, the sensitive data can be identified without the use of tags. Data that is static (e.g., the form templates, styles, outlines, etc.) can be determined to be unsensitive and thus can be sent via the unsecured channel 208. Data that is dynamic, and changes between frames, sessions, etc., can be determined to be sensitive, and thus can be sent via either the secured channel 210 or the secured channel 212 based on the type of data identified.

In some embodiments, the type secured channels created can be based on the time of transmission or based on the location of the mobile device. For instance, if the mobile device 202 is in a location known to have less secure mobile networks (e.g., mobile network 206), the rules can specify a higher level of encryption or different type of encryption (256 bit instead of 128 bit, and etc.).

Figure 3:
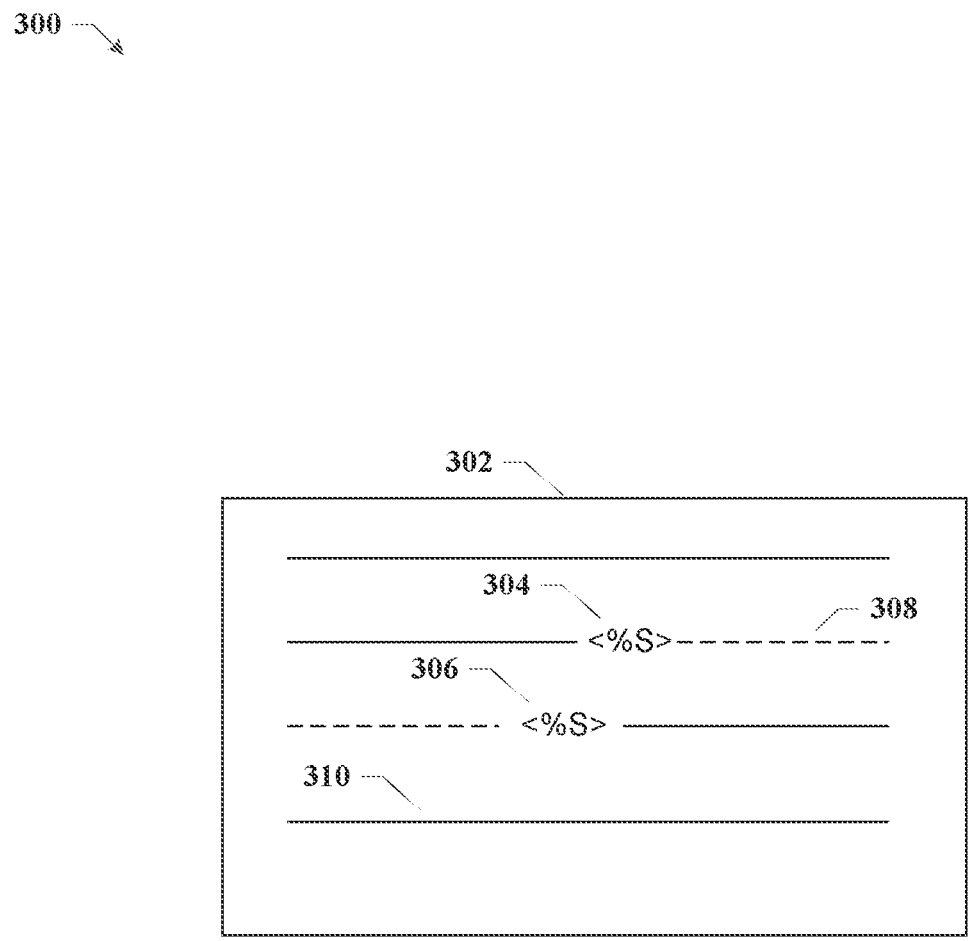
FIG. 3 is an illustration of an example system for providing a SSL/TLS encryption system that uses tags in accordance with one or more aspects of the disclosure.

Turning now to FIG. 3, illustrated is an example system 300 for providing a SSL/TLS encryption system that uses tags in accordance with one or more aspects of the disclosure. In an embodiment, a set of data 302 can include data 310 that does not require encryption, and can be sent via an unsecured channel. The set of data 302 can also include sensitive data 308 that is identified based on an opening tag 304 and a closing tag 306. These tags can indicate to the mobile device that the data within the tags is sensitive and should be transmitted via a secure channel.

Figure 4:
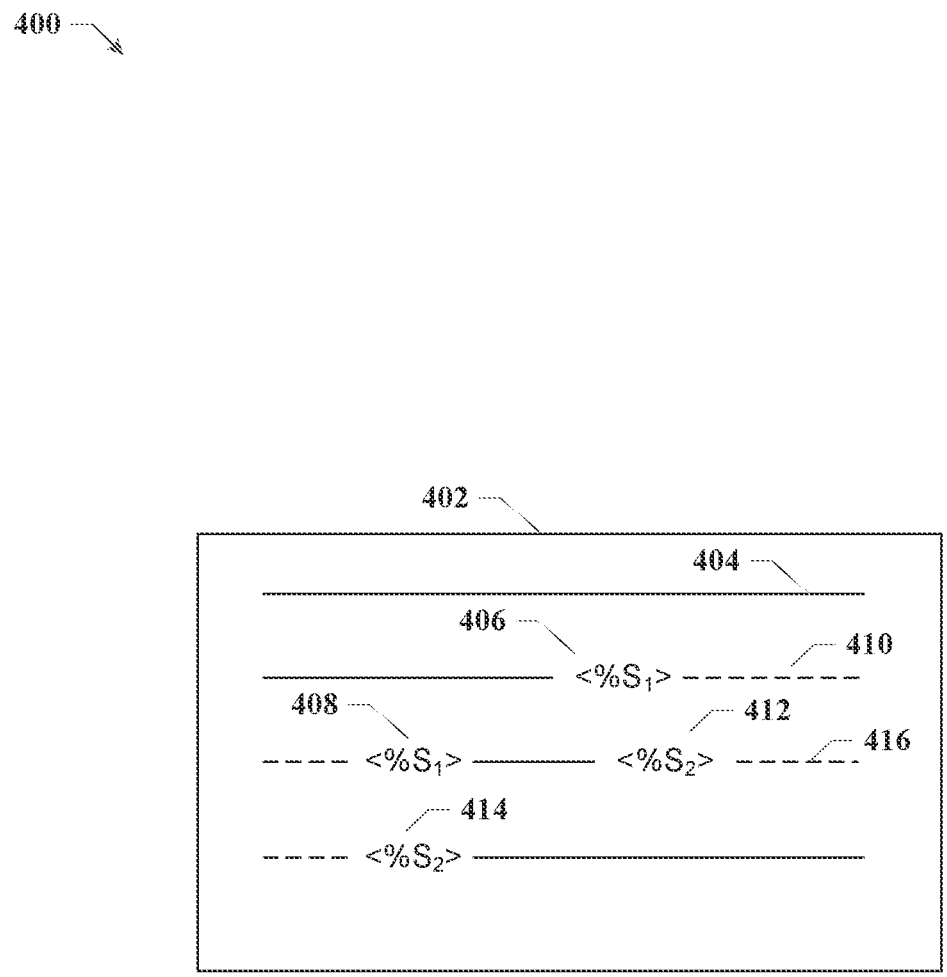
FIG. 4 is an illustration of an example system for providing a SSL/TLS encryption system that uses tags for multiple types of secure channels in accordance with one or more aspects of the disclosure.

Turning to FIG. 4, illustrated is an example system 400 for providing a SSL/TLS encryption system that uses tags for multiple types of secure channels in accordance with one or more aspects of the disclosure. In an embodiment, a set of data 402 can include data 404 that does not require encryption, and can be sent via an unsecured channel. The set of data 402 can also include a first type of sensitive data 410 and a second set of sensitive data 416 that are identified by tags 406 and 408 and 412 and 414 respectively. The tags can identify the type of confidential data (e.g., $S_1$, $S_2$) and can be transmitted via different secure channels based on one or more rules policies stored at the client or the server.

Figure 5:
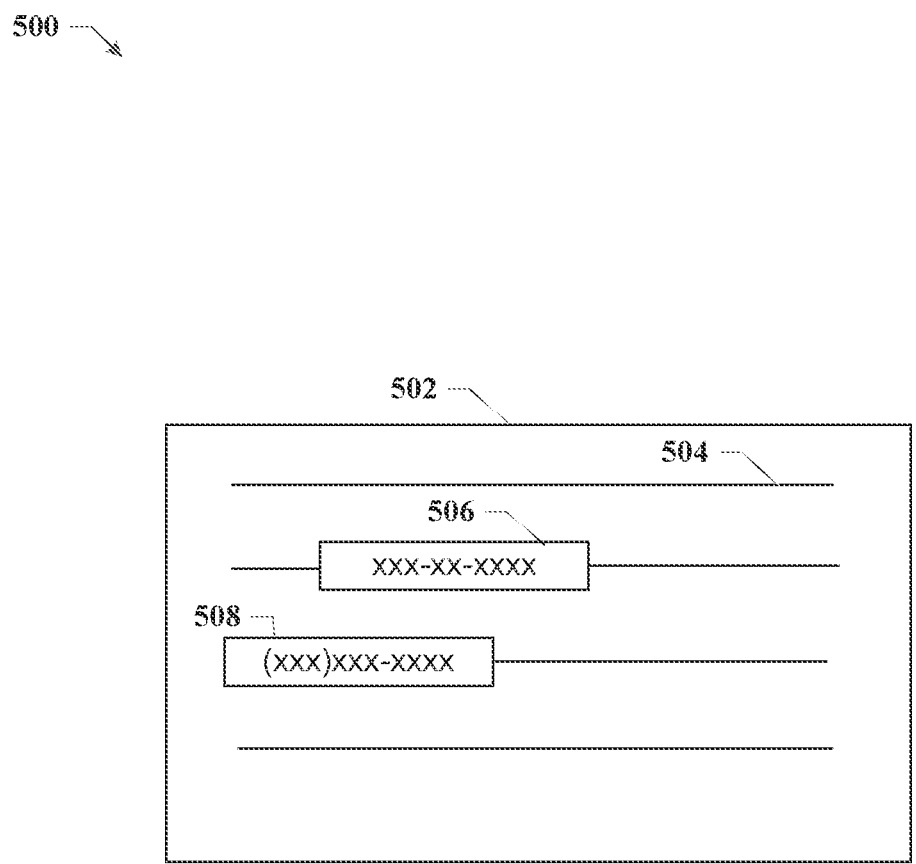
FIG. 5 is an illustration of an example system for providing a SSL/TLS encryption system that can identify sensitive information in accordance with one or more aspects of the disclosure.

Turning now to FIG. 5, illustrated is an example system 500 for providing a SSL/TLS encryption system that can identify sensitive information in accordance with one or more aspects of the disclosure.

In an embodiment, the sensitive data can be identified based on a pattern analysis of the data. Commonly transmitted data that might be sensitive and thus require encryption can be financial information such as bank account numbers, routing numbers, credit card numbers, and etc. The information can also include addresses, names, birthdates, and etc. These types of information commonly follow similar formats such as a pattern of numbers and characters, length of string of characters, and etc. For instance, social security numbers can be recognized by their familiar pattern of 9 numbers separated by dashes in groups of 3, 2, and 4. Similarly, credit card numbers will have common patterns and dates will have similar patterns and other identification numbers and information can be identified similarly.

In the embodiment shown in FIG. 5, set of data can include unsecured data 504 and then include a social security number 506 and a telephone number 508. The system can identify the social security number 506 based on the groupings of 3 digits, 2 digits, and 4 digits respectively separated by dashes. Similarly the phone number 508 can be identified in a similar fashion.

Figure 6:
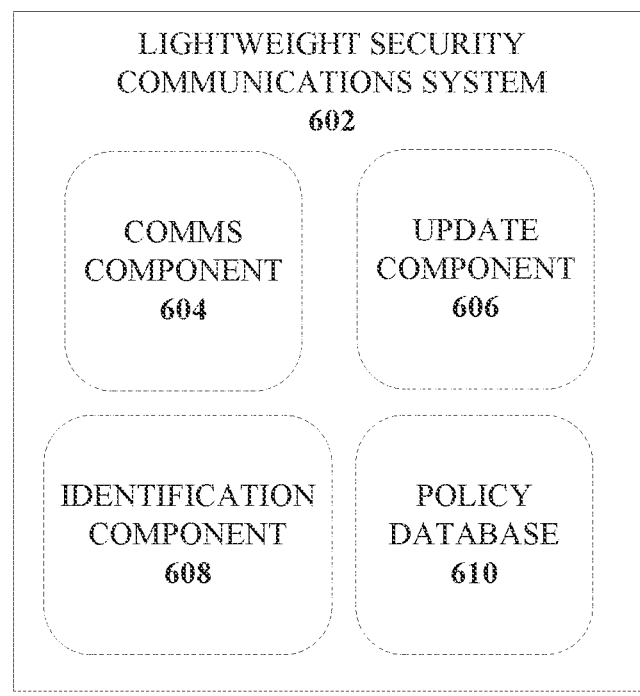
FIG. 6 is an illustration of an example system for providing a SSL/TLS encryption system in accordance with one or more aspects of the disclosure.

Turning now to FIG. 6, illustrated is an example system 600 for providing a SSL/TLS encryption system 602 in accordance with one or more aspects of the disclosure. The system 602 can include an identification component 608 that can identify whether data to be transmitted is sensitive or not. Identification component 608 can determine what is sensitive data or data that otherwise should be encrypted in a variety of ways. In one embodiment, data can be tagged using metadata or HTML tags or other forms of tags, where the tagged data is data the intended to be secured via SSL encryption. In an embodiment, the identification component 608 can identify the tags, and communications component 604 can send untagged data via an unsecured channel and send tagged data via a secured channel.

In other embodiments, the sensitive data can be identified without the use of tags. Data that is static (e.g., the form templates, styles, outlines, etc.) can be determined to be unsensitive and thus can be sent via the unsecured channel. Data that is dynamic, and changes between frames, sessions, etc., can be determined to be sensitive, and thus can be sent via the secured channel.

In other embodiments, the sensitive data can be identified based on a pattern analysis of the data. Commonly transmitted data that might be sensitive and thus require encryption can be financial information such as bank account numbers, routing numbers, credit card numbers, and etc. The information can also include addresses, names, birthdates, and etc. These types of information commonly follow similar formats such as a pattern of numbers and characters, length of string of characters, and etc. For instance, social security numbers can be recognized by their familiar pattern of 9 numbers separated by dashes in groups of 3, 2, and 4. Similarly, credit card numbers will have common patterns and dates will have similar patterns and other identification numbers and information can be identified similarly.

The communications component 604 can be configured to transmit the data to the server, or to a client device, and can simultaneously establish a plurality of communication channels, unsecured and secured. In an embodiment, the communications component 604 can establish two channels, one secured, and one unsecured, and in other embodiments, can establish one unsecured and a plurality of secured channels. Policy database 610 can determine how various types of data are to be treated and handled based on the type of data and the rules. For instance, in an embodiment, all sensitive data can be sent via a first secured channel, and in other embodiments, different types of sensitive data can be sent via different secured channels. An update component 606 can be included to update the policy database 610 based on information received from one or more servers.

Figure 8:
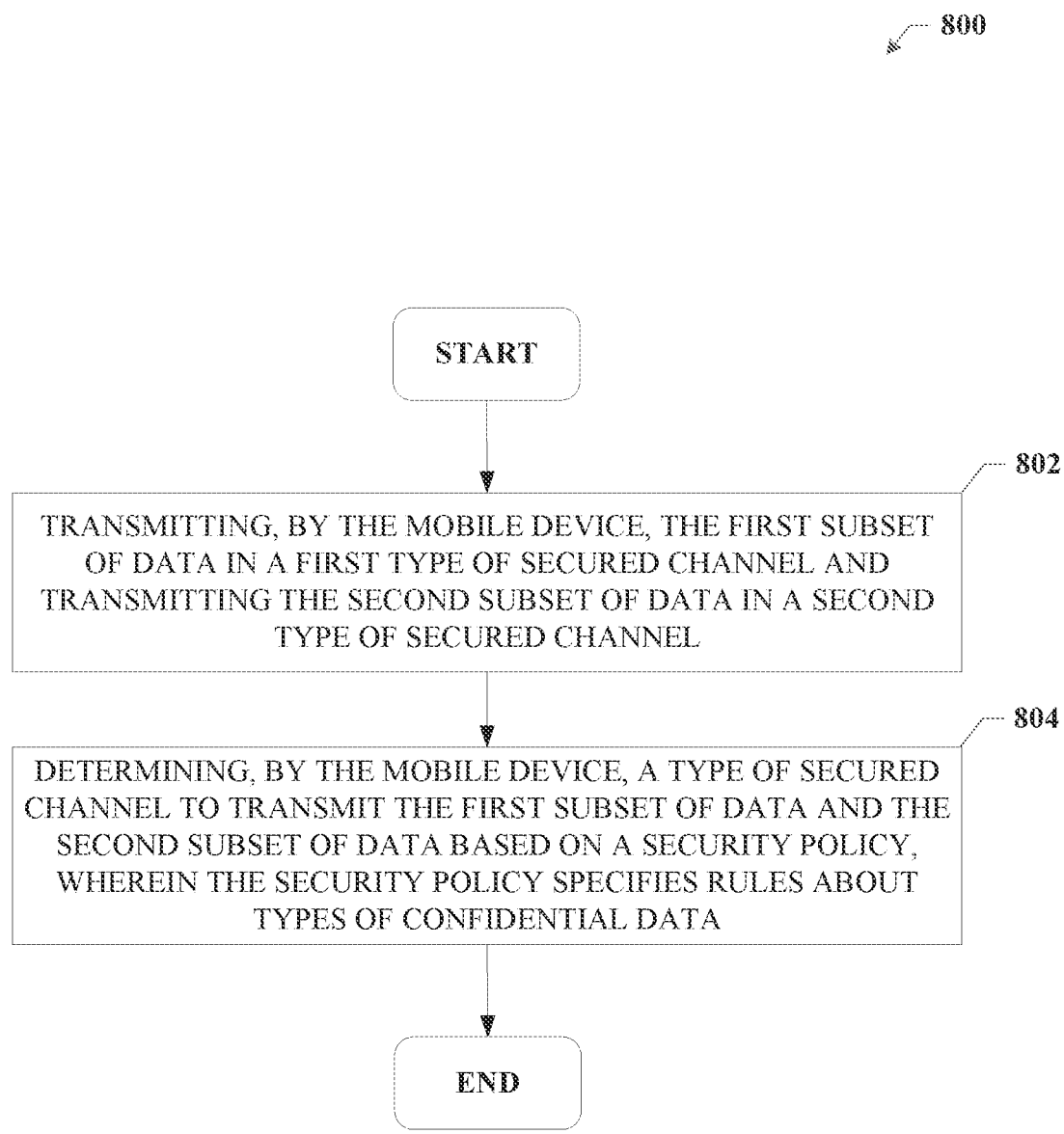
FIG. 8 is an illustration of an example flow chart of a method for providing encryption according to one or more embodiments.

FIGS. 7-8 illustrates processes in connection with the aforementioned systems. The process in FIGS. 7-8 can be implemented for example by systems 100, 200, 300, 400, 500, and 600 illustrated in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Turning now to FIG. 7, illustrated is an example flow chart of a method 700 for providing encryption according to one or more embodiments.

The method can start at 702, where the method includes establishing, by a mobile device comprising a processor, a plurality of data transmission channels to a server, wherein the data transmission channels are configured to transmit a set of data to the server and wherein the plurality of data transmission channels comprise an unsecured channel a secured channel.

The method can continue at 704, where the method includes determining, by the mobile device, that the set of data comprises a first set of confidential data, and a second set of non-confidential data wherein the non-confidential data comprises static information and the confidential data comprises dynamic information. The method can continue at 706 where the method includes transmitting, by the mobile device, the first set of confidential data via the secured channel, and transmitting the non-confidential data via the unsecured channel.

Turning now to FIG. 8, illustrated is an example flow chart of a method 800 for providing encryption according to one or more embodiments.

Method 800 can start at 802 where the method includes transmitting, by the mobile device, the first subset of data in a first type of secured channel and transmitting the second subset of data in a second type of secured channel.

The method can continue at 804 where the method includes determining, by the mobile device, a type of secured channel to transmit the first subset of data and the second subset of data based on a security policy, wherein the security policy specifies rules about types of confidential data.

Figure 9:
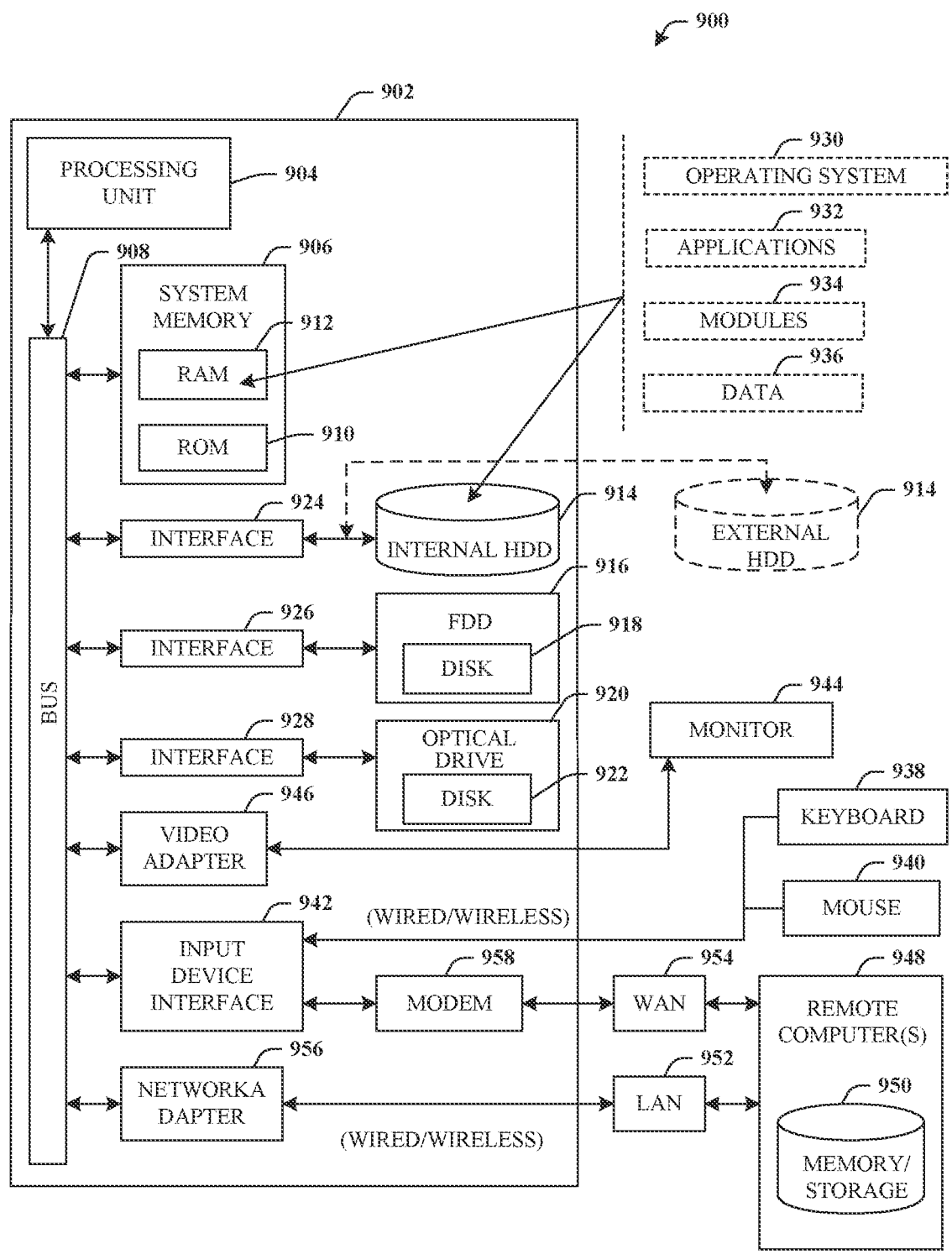
FIG. 9 is an illustration of an example computing environment where one or more of the provisions set forth herein are implemented, according to one or more embodiments.

Referring now to FIG. 9, there is illustrated a block diagram of a computer operable to execute the disclosed architecture. In order to provide additional context for various aspects of the subject innovation, FIG. 9 and the following discussion are intended to provide a brief, general description of a suitable computing environment 900 in which the various aspects of the innovation can be implemented. While the innovation has been described above in the general context of computer-executable instructions that may run on one or more computers, those skilled in the art will recognize that the innovation also can be implemented in combination with other program modules or components and/or as a combination of hardware and software.

Generally, program modules include routines, programs, components, data structures, etc., that perform particular tasks or implement particular abstract data types. Moreover, the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the innovation includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 912, including an operating system 930, one or more application programs 932, other program modules 934 and program data 936. All or portions of the operating system, applications, modules, and/or data can also be cached in the RAM 912. The innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules or components depicted relative to the computer 902, or portions thereof, can be stored in the remote memory/storage device 950. The network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to wired Ethernet networks used in many offices.

Figure 10:
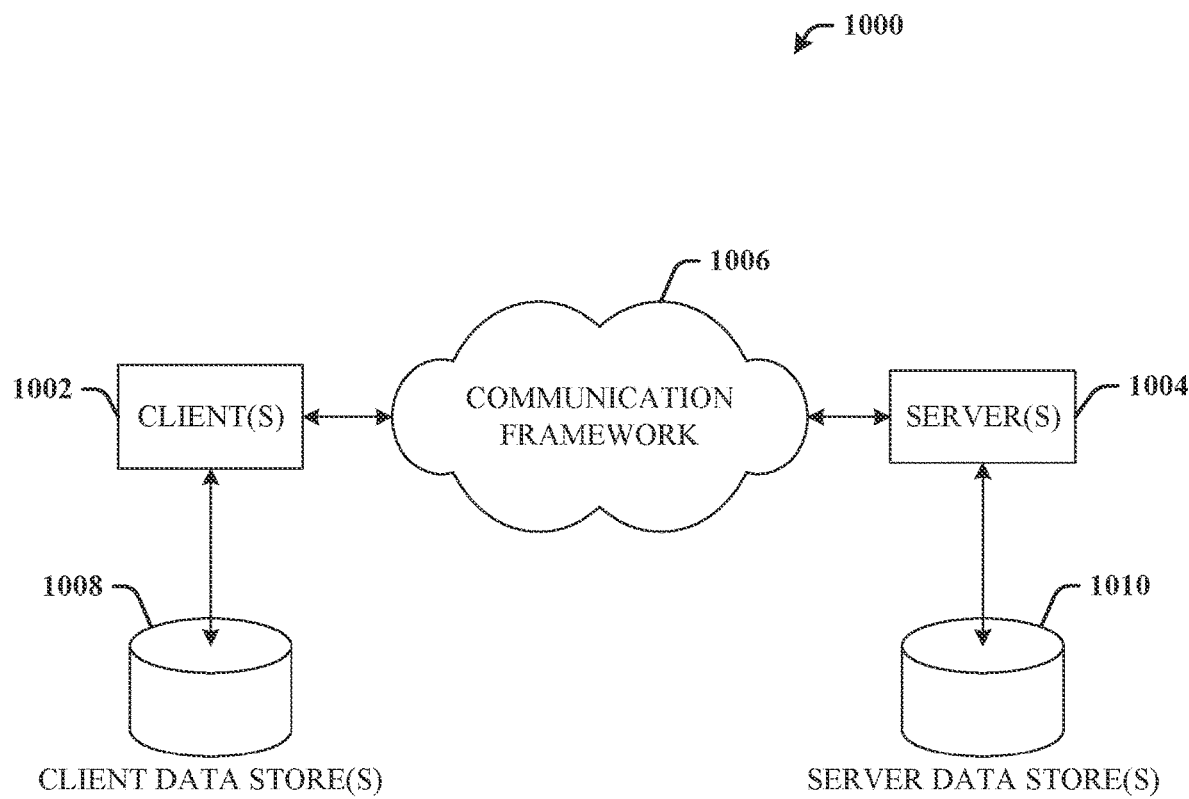
FIG. 10 is an illustration of an example computing environment where one or more of the provisions set forth herein are implemented, according to one or more embodiments.

Referring now to FIG. 10, there is illustrated a schematic block diagram of an exemplary computing environment 1000 in accordance with the subject innovation. The system 1000 includes one or more client(s) 1002. The client(s) 1002 can be hardware and/or software (e.g., threads, processes, computing devices).

The system 1000 also includes one or more server(s) 1004. The server(s) 1004 can also be hardware and/or software (e.g., threads, processes, computing devices). The servers 1004 can house threads to perform transformations by employing the innovation, for example. One possible communication between a client 1002 and a server 1004 can be in the form of a data packet adapted to be transmitted between two or more computer processes. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002. Similarly, the server(s) 1004 are operatively connected to one or more server data store(s) 1010 that can be employed to store information local to the servers 1004.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor coupled to a memory that stores instructions that, when executed by the processor, cause the processor to:
identify static data and dynamic data of a set of data, wherein the dynamic data changes between frames or sessions;
classify the static data as non-sensitive data and the dynamic data as sensitive data based on one or more tags associated with the dynamic data;
determine a security policy based on the one or more tags; and
initiate transmission to a network entity of the non-sensitive data on an unsecure communication channel and the sensitive data on a secure communication channel in accordance with the security policy.

2. The system of claim 1, wherein the instructions further cause the processor to initiate the transmission of the sensitive data based on a security policy that specifies one or more rules regarding the sensitive data.

3. The system of claim 2, wherein at least one of the one or more rules specify encryption type for the sensitive data.

4. The system of claim 2, wherein at least one of the one or more rules specify access rights to the sensitive data.

5. The system of claim 1, wherein the instructions further cause the processor to identify a type of the sensitive data.

6. The system of claim 5, wherein the instructions further cause the processor to identify the type of the sensitive data based on a tag associated with the sensitive data.

7. The system of claim 5, wherein the instructions further cause the processor to identify the type of the sensitive data based on determining a form of the sensitive data.

8. The system of claim 5, wherein the instructions further cause the processor to vary one of encryption or communication channel based on the type of the sensitive data.

9. The system of claim 1, wherein the static data comprises page layout, style, or template information.

10. The system of claim 1, wherein the dynamic data comprises name, address, or financial information.

11. A method, comprising:
identifying static data and dynamic data in a set of data, wherein the dynamic data changes between frames or sessions;
classifying the static data as non-sensitive data and the dynamic data as sensitive data based on one or more tags associated with the dynamic data;
opening at least one secure communication channel and at least one unsecure communication channel to a network entity;
determining a security policy based on the one or more tags; and
initiating transmission, to the network entity, of the non-sensitive data over the unsecure communication channel and the sensitive data over the secure communication channel in accordance with the security policy.

12. The method of claim 11, further comprising initiating transmission of the sensitive data based on a security policy that specifies one or more rules associated with the sensitive data.

13. The method of claim 12, further comprising initiating encryption of the sensitive data based on a rule of the one or more rules that specifies an encryption scheme for the sensitive data.

14. The method of claim 12, further comprising setting access rights for the sensitive data based on a rule of the one or more rules.

15. The method of claim 12, further comprising varying employment of at least one of encryption or communication channel based on a type of the sensitive data.

16. The method of claim 15, further comprising identifying the type of the sensitive data based on a tag associated with the sensitive data.

17. The method of claim 15, further comprising identifying the type of the sensitive data based on one or more features of the sensitive data.

18. A computer-readable storage medium that stores instruction that, when executed by a processor, cause the processor to perform operations, comprising:
identifying static data and dynamic data in a set of data, wherein the dynamic data changes between frames or sessions;
classifying the static data as non-sensitive data and the dynamic data as sensitive data based on one or more tags associated with the dynamic data;
determining a security policy based on the one or more tags;
establishing at least one secure communication channel and at least one unsecure communication channel to a network entity; and
initiating transmission to the network entity of the non-sensitive data on the unsecure communication channel and the sensitive data on the secure communication channel in accordance with the security policy.

19. The computer-readable storage medium of claim 18, the operations further comprising initiating transmission of the sensitive data based on a security policy that specifies one or more rules associated with the sensitive data.

20. The computer-readable storage medium of claim 19, the operations further comprising varying employment of at least one of encryption or communication channel based on a determined type of the sensitive data.

* * * * *